United States Patent [19]
Pillon et al.

[11] 3,779,738
[45] Dec. 18, 1973

[54] HERBICIDAL PARA-TERT-BUTYLPHENYL UREA

[75] Inventors: Daniel Pillon; Pierre Poignant, both of Lyon; Rodolphe Caffiero, Crezieu La Varenne, all of France

[73] Assignee: PERRO, Societe pour de Developpement et la Vente de Specialities Chimiques, Lyon, France

[22] Filed: Oct. 22, 1970

[21] Appl. No.: 83,230

[30] Foreign Application Priority Data
Oct. 27, 1969  France .............................. 6936835

[52] U.S. Cl. .................................................. 71/120
[51] Int. Cl. ............................................ A01n 9/20

[58] Field of Search ........................................ 71/120

[56] References Cited
UNITED STATES PATENTS
2,655,447   10/1953   Todd ..................................... 71/120
3,488,182   1/1970    Ebner ................................... 71/120
3,205,258   9/1965    Simonian .............................. 71/120

FOREIGN PATENTS OR APPLICATIONS
821,103   9/1959   Great Britain ....................... 71/120

Primary Examiner—Glennon H. Hollrah
Attorney—Browdy & Neimark

[57]         ABSTRACT

N-p-tert-butylphenyl-N'N'-dimethylurea, or PTBU, is found to have selective herbicidal activity.

5 Claims, No Drawings

HERBICIDAL PARA-TERT-BUTYLPHENYL UREA

The present invention relates to a new urea derivative, and to the use thereof as a herbicide. It relates more particularly to N-p-tert-butylphenyl-N'N'-dimethylurea having the formula

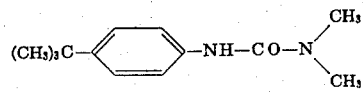

(which will be referred to hereinafter as P.T.B.U.), and to the use thereof as active material in herbicidal compositions having selective action.

The invention relates also to herbicidal compositions containing P.T.B.U. mixed with fillers and adjuvants conventionally used in the parasiticide industry.

Very many urea derivatives have been known for a long time as having herbicidal properties.

Among the numerous patents and reports relating to this type of compound, we may quote in particular the U.S. Pat. No. 2,655,447, which claims more particularly compounds having the formula

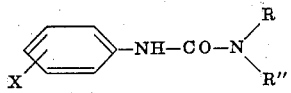

wherein X is one or more radicals, such as halogen or lower alkyl, and R' and R'' are alkyl radicals containing one or two carbon atoms.

Among the compounds covered by the above general formula, we may mention in particular:

N-3,4-dichlorophenyl-N'N'-dimethylurea or Diuron
N-4-chlorophenyl-N'N'-dimethylurea or Monuron
N-4-tert-butylphenyl-N'N'-dimethylurea or P.T.B.U.

But, whereas Diuron and Monuron have been known and used in many applications for a long time, P.T.B.U. has never formed the subject-matter of any published work, so far as we know, save that it is mentioned in the aforesaid Patent.

It should be noted that said Patent only indicates the formula of said compound, without having any information about the physical or chemical characteristics, or the biological properties thereof.

Our work has led first to the synthesis of said compound, and then has brought out the herbicidal properties thereof. Unexpectedly, said properties have proved to be quite different from that of Diuron or Monuron, whereas the information given thereabout by the U.S. Pat. No. 2,655,447 would lead those skilled in the art to think that all said compounds are equivalent. This is not the case, however, as will be made conspicuous by the examples given hereinafter: P.T.B.U. differentiates itself from its homologs by a very high selectivity towards many crops of such economic importance as wheat, maize, cotton, and soja.

Diuron and Monuron cannot be used on wheat, maize, and soja, and Diuron can only be used on cotton with special precautions, since its safety margin towards cotton is comparatively small.

The compound according to the present invention can be produced by conventional synthesis methods for such a type of compound; that is, either by acting on an amine with a phenyl isocyanate, according to the following reaction

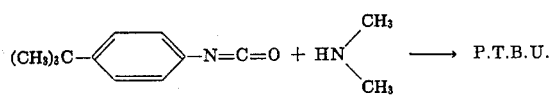

or by acting on a carbamyl chloride with a substituted aniline, according to the following reaction

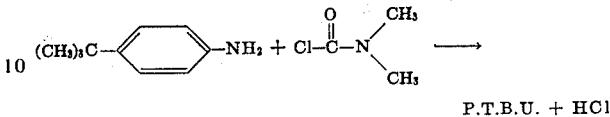

We used the first of the above-mentioned methods for preparing P.T.B.U., as shown in the following example.

EXAMPLE 1

Synthesis of P.T.B.U.

1,050 g (6 M) of p-tert-butylphenyl-isocyanate in 2,000 ml of anhydrous benzene are put into a 6,000 ml three-necked reaction vessel. 400 g (9 M) of dimethylamine in 1,000 ml of anhydrous benzene are then poured slowly into the vessel, while cooling the latter externally by means of an ice or acetone bath, so as to keep the temperature at about 35°–40°C. After the amine is completely poured in, the reaction mixture is raised to ebullition with reflux for one hour. The hot solution is then transferred to a 6,000 ml flask, wherein the product crystallizes by cooling. After complete cooling, the crystals are filtered, drained, washed, and then vacuum-dried.

A total amount of 1,252 g of white product is obtained, m.p. 155°–157°C. The yield of the operation is 95 percent.

The analysis gives the following results:

|  | C, % | H, % | N, % |
|---|---|---|---|
| Calculated | 70.91 | 9.09 | 12.75 |
| Found | 70.63 | 8.98 | 12.94 |

The herbicidal properties of this compound have been brought out by various tests carried out both in greenhouse and in the open air on a large number of test plants.

To carry out such tests, the products according to the invention were formulated as follows: a wettable powder containing 20 percent of active material was prepared by intimately mixing the following components during one minute in a knife mill:

P.T.B.U. —20 percent
Deflocculating agent (Ca lignosulfate)—5 percent
Wetting agent (Na alkylarylsulfonate) — 1 percent
Filler (alumina silicate) — 74 percent The wettable powder thus obtained is then diluted in order to give it the strength corresponding to the quantity of active material wanted to be used per hectare.

EXAMPLE 2

Greenhouse Tests

In these tests, pots are sown with seeds of the plant species on which the activity of the product is to be tested, and then the seeds are covered with a layer of earth, the thickness of which depends on the seed diameter.

Depending on the type of test, the active material to be tested, diluted as previously explained, is then sprayed either immediately on the pots (pre-shooting treatment), or after the seeds have shot (post-shooting treatment).

Every test is repeated twice, while untreated reference seeds are kept to measure a possible inhibition in growth, and check the correctness of the plant growth.

By way of comparison, Diuron and Monuron prepared in the same manner as P.T.B.U. have been tested under the same conditions, and on the same test plants.

The results appear in the following table, wherein the figures indicated correspond to the percentage of destruction of the species concerned, with doses of 2 and 4 kg per hectare.

| Plant species | Diuron 2 kg./ha. | Diuron 4 kg./ha. | P.T.B.U. 2 kg./ha. | P.T.B.U. 4 kg./ha. | Monuron 2 kg./ha. | Monuron 4 kg./ha. |
|---|---|---|---|---|---|---|
| Oat grass (Avena fatua) | 100 | 100 | 70 | 100 | 100 | 100 |
| Wheat (Triticum vulgare) | 98 | 98 | 0 | 0 | 95 | 95 |
| Maize (Zea Mays) | 100 | 100 | 0 | 0 | 100 | 100 |
| Rye grass (Lolium sp.) | 100 | 100 | 90 | 100 | 100 | 100 |
| Foxtrail (Alopecurus myosuroides) | 100 | 100 | 80 | 100 | 100 | 100 |
| Amaranth (Amaranthus sp.) | 100 | 100 | 85 | 100 | 100 | 100 |
| Carrot (Daucus carotta) | 100 | 100 | 0 | 0 | 100 | 100 |
| Beet (Beta vulgaris) | 100 | 100 | 100 | 10ᴊ | 100 | 100 |
| Chenopodium (Chenopodium sp.) | 100 | 100 | 98 | 98 | 100 | 100 |
| Cotton (Gossypium sp.) | 30 | 98 | 0 | 0 | 80 | 80 |
| Lucerne (Medicago sativa) | 100 | 100 | 100 | 100 | 100 | 100 |
| Mustard (Sinapis alba) | 100 | 100 | 85 | 85 | 100 | 100 |
| Buckwheat (Polygonum fagop) | 100 | 100 | 100 | 100 | 100 | 100 |
| Soja (Glycine hispiola) | 100 | 100 | 0 | 0 | 100 | 100 |
| Tomato (Lycopersicum escul.) | 100 | 100 | 95 | 100 | 100 | 100 |

These results clearly bring out the unexpected herbicidal properties of P.T.B.U. as compared with the homologs thereof previously known.

It may thus be noted that P.T.B.U. is a herbicide remarkable for its selectivity towards crops such as wheat, maize, cotton, soja and carrots when it is used in amounts which give it a very good herbicidal action against numerous plant species, both graminaceous and dicotyledonous. It should be noted in particular the P.T.B.U. might be used to fight against foxtail, oat grass, and rye grass in wheat crops, these weeds representing a very important problem in many countries.

EXAMPLE 3

Field Tests

Tests with P.T.B.U. were also carried out in the open air, on 10 sq. m. plots, both in pre-emergence and post-emergence treatments.

In pre-emergence treatments, from an amount of 2 kg/ha, P.T.B.U. destroys bent-grass (Agrostis spicaventi), rye grass (Lolium perenne), and limits efficiently the growth of Dicotyledones. Its selectivity towards wheat is good.

In post-emergence treatments, from an amount of 1.5 kg/ha, P.T.B.U. completely destroys foxtail (Alopecurus agrestis), cockle (Lolium strictum) and bent-grass (Agrostis spicaventi). Oat grass (Avena fatua and Avena ludoviciana), Italian rye grass (Lolium perenne) are destroyed by amounts of 3 kg/ha. So it is with numerous Dicotyledones, among which: wild camomile (Matricaria chamomilla), corn poppy (Papaver rhaeas), mustard (Sinapis arvensis), wormseed (Ambrosia artemisiaefolia), starwort (Stellaria media) and knotgrass (Polygonum sp.). This herbicidal action is associated with a very good selectivity towards wheat.

These results are remarkable in that they show that P.T.B.U. can be used successfully over a very long period of time, enabling thus the treatment to be performed at a time where, for instance, the condition of the ground enables the treating apparatus to enter the fields.

In practice, P.T.B.U. should be used in amounts ranging from 0.5 to 10 kg/ha, depending on the nature of the treatment to be performed, and the variety and growth of the adventitious weeds present.

P.T.B.U. should generally be formulated according to the conventional methods used in the herbicide industry, so as to provide the users with compositions, the use of which is easy, and the herbicidal activity of which is maximal.

To this end, a number of various fillers and adjuvants are added to the pure active materials, according to the type of formulation contemplated, and the result to be obtained.

Such formulations are either in the liquid state, such as emulsions, solutions, pastes, suspensions, or the like, ready for use or having to be water-diluted, or in the solid state, such as wettable powders, granules, or the like, adapted to be used as such or to be diluted in a liquid medium before use. These latter compositions generally include inert fillers and/or organic, mineral, or mixed solvents, and/or emulsifying agents, adhesive agents, anti-caking agents, deflocculating agents, and so on.

Particulars about such formulations may be found in particular in the book of Fryer & Evans "Weed Control Handbook," 5th edition, pp. 101 and upwards.

What we claim is:

1. A method for control of undesirable vegetation in wheat comprising applying to the wheat locus to be protected an amount effective to control the undesirable vegetation without affecting the crop plants of N-p-tert.-butyl-phenyl-N'N'-dimethylurea.

2. A method for control of undesirable vegetation in cotton comprising applying to the cotton locus to be protected an amount effective to control the undesirable vegetation without affecting the crop plants of N-p-tert.-butyl-phenyl-N'N'-dimethylurea.

3. A method for control of undesirable vegetation in soja comprising applying to the soja locus to be protected an amount effective to control the undesirable vegetation without affecting the crop plants of N-p-tert.-butyl-phenyl-N'N'-dimethylurea.

4. A method for control of undesirable vegetation in maize comprising applying to the maize locus to be protected an amount effective to control the undesirable vegetation without affecting the crop plants of N-p-tert.-butyl-phenyl-N'N'-dimethylurea.

5. A method for control of undesirable vegetation in carrots comprising applying to the carrots locus to be protected an amount effective to control the undesirable vegetation without affecting the crop plants of N-p-tert.-butyl-phenyl-N'N'-dimethylurea.

* * * * *

UNITED STATES PATENT OFFICE
CERTIFICATE OF CORRECTION

Patent No. 3,779,738                    Dated Dec. 18, 1973

Inventor(s) Daniel PILLON et al.

It is certified that error appears in the above-identified patent and that said Letters Patent are hereby corrected as shown below:

In the title page, at line [73], delete "PERRO" and insert --PEPRO--

Signed and sealed this 8th day of October 1974.

(SEAL)
Attest:

McCOY M. GIBSON JR.
Attesting Officer

C. MARSHALL DANN
Commissioner of Patents